(12) United States Patent
Zhang et al.

(10) Patent No.: US 11,097,748 B2
(45) Date of Patent: Aug. 24, 2021

(54) TWO-STEP REFERENCE LINE SMOOTHING METHOD TO MIMIC HUMAN DRIVING BEHAVIORS FOR AUTONOMOUS DRIVING CARS

(71) Applicant: Baidu USA LLC, Sunnyvale, CA (US)

(72) Inventors: Liangliang Zhang, San Jose, CA (US); Dong Li, Sunnyvale, CA (US); Jiangtao Hu, Sunnyvale, CA (US); Jiaming Tao, Sunnyvale, CA (US); Jinyun Zhou, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 326 days.

(21) Appl. No.: 16/168,709

(22) Filed: Oct. 23, 2018

(65) Prior Publication Data

US 2020/0122721 A1    Apr. 23, 2020

(51) Int. Cl.
| | | |
|---|---|---|
| *B60W 60/00* | (2020.01) | |
| *B60W 30/12* | (2020.01) | |
| *G01C 21/34* | (2006.01) | |
| *G05D 1/00* | (2006.01) | |
| *G05D 1/02* | (2020.01) | |
| *G06K 9/00* | (2006.01) | |

(52) U.S. Cl.
CPC ...... *B60W 60/00274* (2020.02); *B60W 30/12* (2013.01); *B60W 60/0027* (2020.02); *B60W 60/00272* (2020.02); *G01C 21/3453* (2013.01); *G05D 1/0088* (2013.01); *G05D 1/0217* (2013.01); *G06K 9/00798* (2013.01); *B60W 2520/06* (2013.01); *B60W 2552/30* (2020.02); *G05D 2201/0213* (2013.01)

(58) Field of Classification Search
CPC ..... B60W 60/00274; B60W 60/00272; B60W 60/0027; B60W 30/12; B60W 2520/06; B60W 2552/30; G01C 21/3453; G05D 1/0088; G05D 1/0217; G05D 2201/0213; G06K 9/00798
See application file for complete search history.

(56) References Cited

U.S. PATENT DOCUMENTS

| | | | |
|---|---|---|---|
| 6,385,539 B1 * | 5/2002 | Wilson | G01C 21/30 701/468 |
| 8,718,932 B1 * | 5/2014 | Pack | G01C 21/30 701/447 |
| 9,428,187 B2 | 8/2016 | Lee | |

(Continued)

*Primary Examiner* — Dale W Hilgendorf
(74) *Attorney, Agent, or Firm* — Womble Bond Dickinson (US) LLP

(57) ABSTRACT

A method of determining a smooth reference line for navigating an autonomous vehicle in a manner similar to human driving is disclosed. A high density map is used to generate a centerline for a lane of roadway. Using the centerline, a number of sample points is generated that is related to a curvature of the centerline. Adjustment points are generated at each sample point, a few on either side of the centerline at each sample point. Candidate points at a sample point include the adjustment points and sample point. A least cost path is determined through each of the candidate points at each of the sample points. Path cost is based an angle of approach and departure through a candidate point, and a distance of the candidate point from the centerline.

24 Claims, 10 Drawing Sheets

(56) References Cited

U.S. PATENT DOCUMENTS

| | | | |
|---|---|---|---|
| 2014/0278095 A1* | 9/2014 | Kaehler | G01C 21/3407 |
| | | | 701/533 |
| 2015/0039212 A1* | 2/2015 | Kido | G08G 1/167 |
| | | | 701/117 |
| 2015/0353085 A1* | 12/2015 | Lee | B60W 30/12 |
| | | | 701/533 |
| 2018/0086373 A1* | 3/2018 | Tamura | B60W 30/12 |
| 2018/0129203 A1* | 5/2018 | Tafti | G05D 1/0005 |
| 2018/0129214 A1* | 5/2018 | During | B60W 30/095 |
| 2018/0267548 A1* | 9/2018 | Sumioka | B60W 30/09 |
| 2018/0345963 A1* | 12/2018 | Maura | G05D 1/0223 |
| 2019/0086930 A1* | 3/2019 | Fan | G05D 1/0223 |
| 2020/0207372 A1* | 7/2020 | Akamatsu | B60W 60/0018 |

* cited by examiner

TWO-STEP REFERENCE LINE SMOOTHING METHOD TO MIMIC HUMAN DRIVING BEHAVIORS FOR AUTONOMOUS DRIVING CARS

TECHNICAL FIELD

Embodiments of the present disclosure relate generally to operating autonomous vehicles. More particularly, embodiments of the disclosure relate to determining a reference line for operating an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

Motion planning for autonomous driving vehicles (ADVs) use a high-definition map (HD map) as input. In the prior art, the center line of a lane of a roadway, determined from the HD map, is used as a reference line for planning. The ADV uses the best effort of the ADV's control system to drive along the reference line unless there is a blocking obstacle. However, techniques that use the raw center line points determined from the HD map may not be the best, smoothest, path for the ADV. Closely following the center line of a lane, especially if the lane has many curves, may not be comfortable for passengers and may reduce the smoothness of navigation of the ADV. Human drivers will sometimes adjust the lane position of a car while the human driver navigates the car through a sequence of turns. ADVs in the prior art follow a reference line determined as the center of a lane of a roadway and do not adjust the reference line to mimic human driving behavior.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
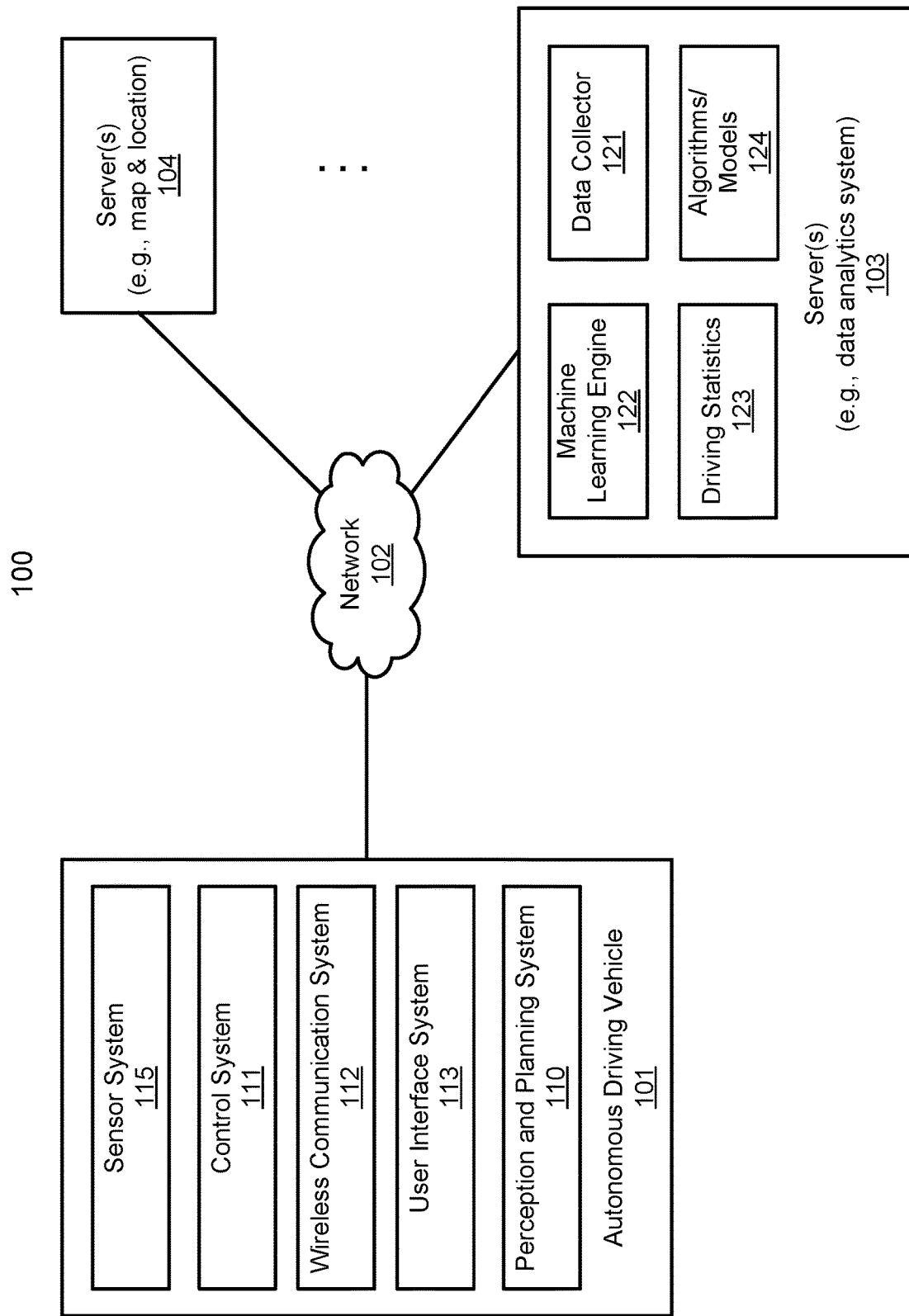
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In a first embodiment, a method of navigating an autonomous driving vehicle (ADV) includes sampling a plurality of points from a centerline of a lane of a first portion of a roadway to generate a plurality of sample points. For each sample point in the plurality of sample points, a plurality of adjustment points are generated that are each associated with the sample point. The adjustment points are in a region surrounding the sample point. The sample point, and the plurality of adjustment points at the sample point, are candidate points for the sample point. For a first plurality of sample points, a first lowest cost path curve is generated through a candidate point of each sample point in the plurality of sample points. The ADV is navigated along the first lowest cost path for the first portion of the roadway. In an embodiment, a second lowest cost path is generated for a second portion of the roadway. The first and second lowest cost paths are combined to generate a combined path for the first and second portions of the roadway. The ADV can be navigated along the first and second portions of roadway using the combined paths. In an embodiment, the first and second lowest cost paths can be combined using a splining algorithm. In an embodiment, the adjustment points at each sample point can be generated on a line that is substantially perpendicular to the centerline of the roadway at the sample point. In an embodiment, a density of the sampling of points along the centerline can be based on the curvature or straightness of the centerline. Sample points can be more dense where the centerline curves and less dense where the centerline is straight. Density of sample points in a curved portion of the centerline can increased as a radius of curvature of the centerline decreases. The lowest cost path for a portion of roadway can be determined by determining a sum of the cost of navigating from each candidate point at a preceding sample point, through each candidate point at a sample point, to each candidate point at a following sample point. In an embodiment, the cost through each candidate point at the sample point can be determined from an angle determined based on a first speed and direction vector of the ADV as it approaches the candidate point at the sample point from a candidate point at the preceding sample point, and a second speed and direction vector of the ADV from the candidate point at the sample point to a candidate point at the following sample point. The cost through each candidate point at the sample point can further be based on a distance between the candidate point and the center line. A total cost of a path candidate is determined based on a sum of the cost of each candidate point forming the candidate path.

In second embodiment, any of the above method operations can be implemented by executing instructions stored on a non-transitory computer-readable medium, the instructions executed by a processing system of the ADV that includes at least one hardware processor.

In a third embodiment, any of the above method operations can be performed on a system that includes a memory programmed with executable instructions, the memory coupled to a processing system having at least one hardware processor, the method operations carried out when the instructions are executed by the processing system.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of network such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous driving vehicle (ADV) 101 refers to a vehicle that can be configured to operate in an autonomous mode in which the vehicle navigates through an environment with little or no input from a driver. Such an autonomous driving vehicle can include a sensor system 115 having one or more sensors that are configured to detect information about the environment in which the ADV 101 operates. The ADV 101 and its associated controller(s) use the detected information to navigate through the environment. Autonomous driving vehicle 101 can operate in a manual mode, a full autonomous mode, or a partial autonomous mode. In a manual mode, the ADV 101 can be operated by a human driver with little, or no, assistance for logic onboard the autonomous vehicle. In full autonomous mode, the ADV 101 can be operated using little, or no, human driver assistance. In partial autonomous mode, ADV 101 can be operated with some or all driving logic subsystems active, and a human driver providing some driving control inputs.

In one embodiment, autonomous driving vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
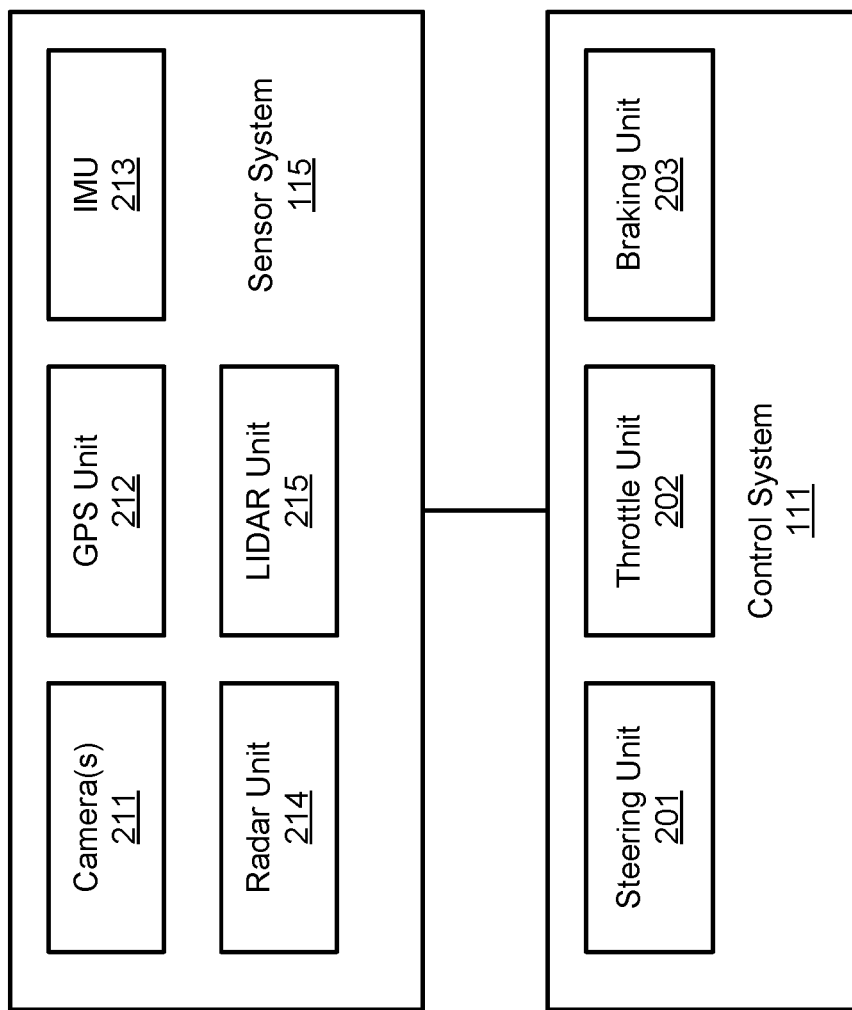
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

Sensor system 115 can detect obstacles to a path of an ADV. Such obstacles can be taken into account by a least cost path module that emulates human driving behavior.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof. Steering unit 201 can be controlled, at least in part, by a least cost path module that participates in determining a path for navigating the ADV along a route.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, or a high frequency (e.g. 2.4 GHz to 2.48 GHz) short range wireless communication technology such as BLUETOOTH®, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

In an embodiment, data collector 121 can record data comprising driving statistics 123 for an initial path for a portion of an ADV route, and a selected least cost path for the portion of the route. And initial path can be, for example, a path that follows a centerline of a lane of roadway. A least cost path may deviate from the initial path to emulate human driving for a smoother traversal of a portion of a route. Driving statistics 123 can also include sensor data and control input data associated with the ADV while it drives along the least cost path for the portion of the route. Driving statistics 123 for the least cost path can include speed, heading, steering input, braking input, if any, and sensor data including lateral forces, acceleration, and braking forces, and the like, such as may affect passenger comfort as the ADV drives along the least cost path. Machine learning engine 122 can use driving statistics 123 to generate algorithms and models 124 that can be used to upgrade ADV driving logic to improve the ADV least cost path determinations for a portion of a route.

Algorithms 124 can then be uploaded on ADVs to be utilized during autonomous driving in real-time. In an embodiment, ADVs 101 can upload driving statistic data to server(s) 103 to facilitate crowd-sourced learning of algorithms and models 124 that can be downloaded to an ADV to update its least cost path module 308. For example, machine learning 122 can determine speed vs. steering input relationships that affect passenger comfort, wherein the speed and steering input are both within acceptable limits, but passenger comfort detected by IMUs or roll-pitch indicate levels that affect passenger comfort. Similarly, algorithms and models 124 can be determined that provide greater passenger comfort and greater speed with less turning angle using data produced by the least cost path module.

Figure 3A:
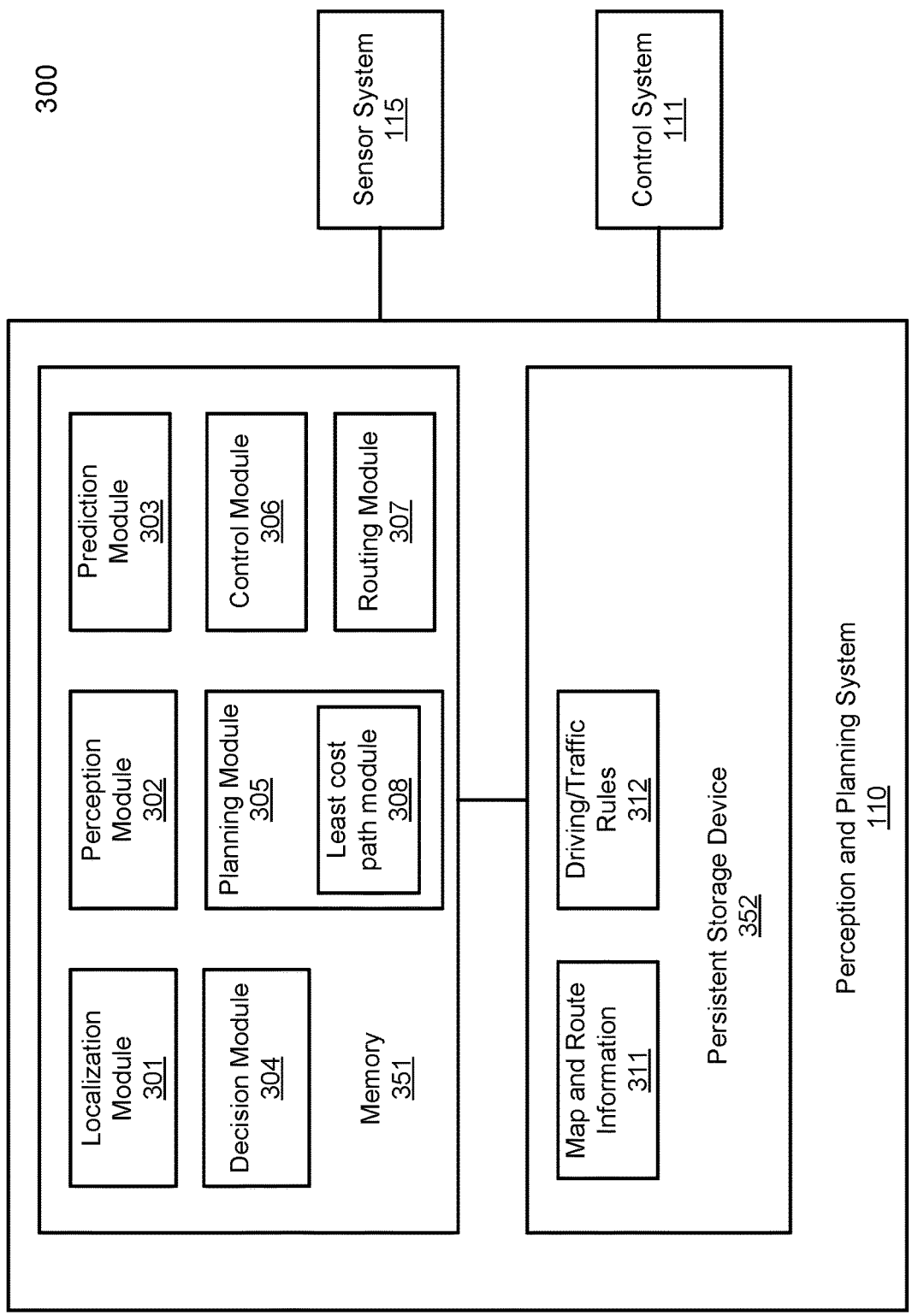
FIGS. 3A-3B are block diagrams illustrating an example of a perception and planning system used with an autonomous vehicle according to one embodiment.
Figure 3B:
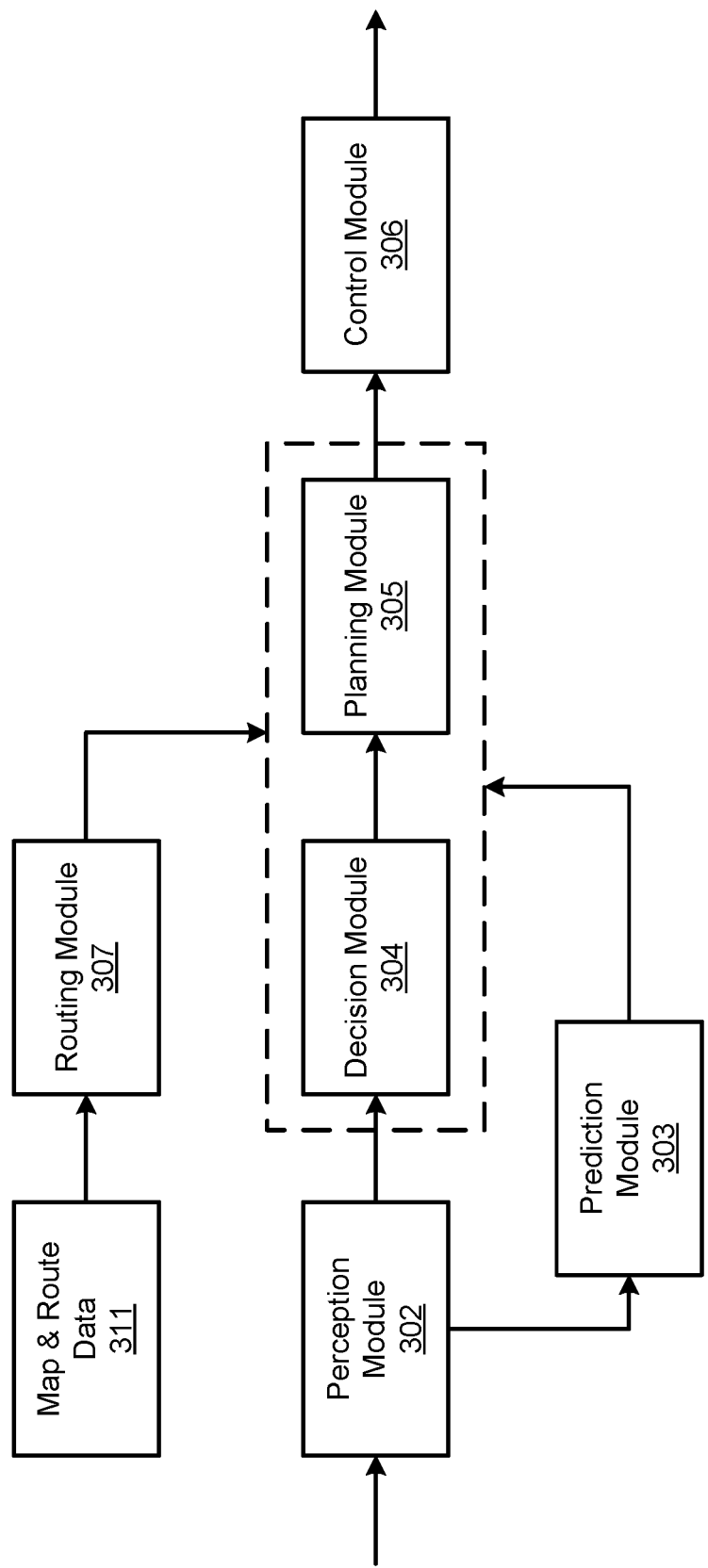

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and least cost path module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Planning module 305 can include least cost path module 308, to provide a smooth reference line for navigating the ADV 101 similar to human driving. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Least cost path module 308 can determine a smooth reference line for a path through a portion of a lane of roadway that emulates human driving style. Human drivers, faced with one or more turns in a path of a driving route, will often select different positions within a lane as they approach a turn, and may veer to one side or the other of a centerline of a lane on the path to try to smooth out the sharpness of the turns executed by the vehicle. Least cost path module 308 can emulate human driving behavior by analyzing a sequence or paths, each path being a portion of a route to navigate the ADV. Least cost path module 308 can form a portion of planning module 305, as shown in FIG. 3B, and described in more detail below.

Figure 4A:
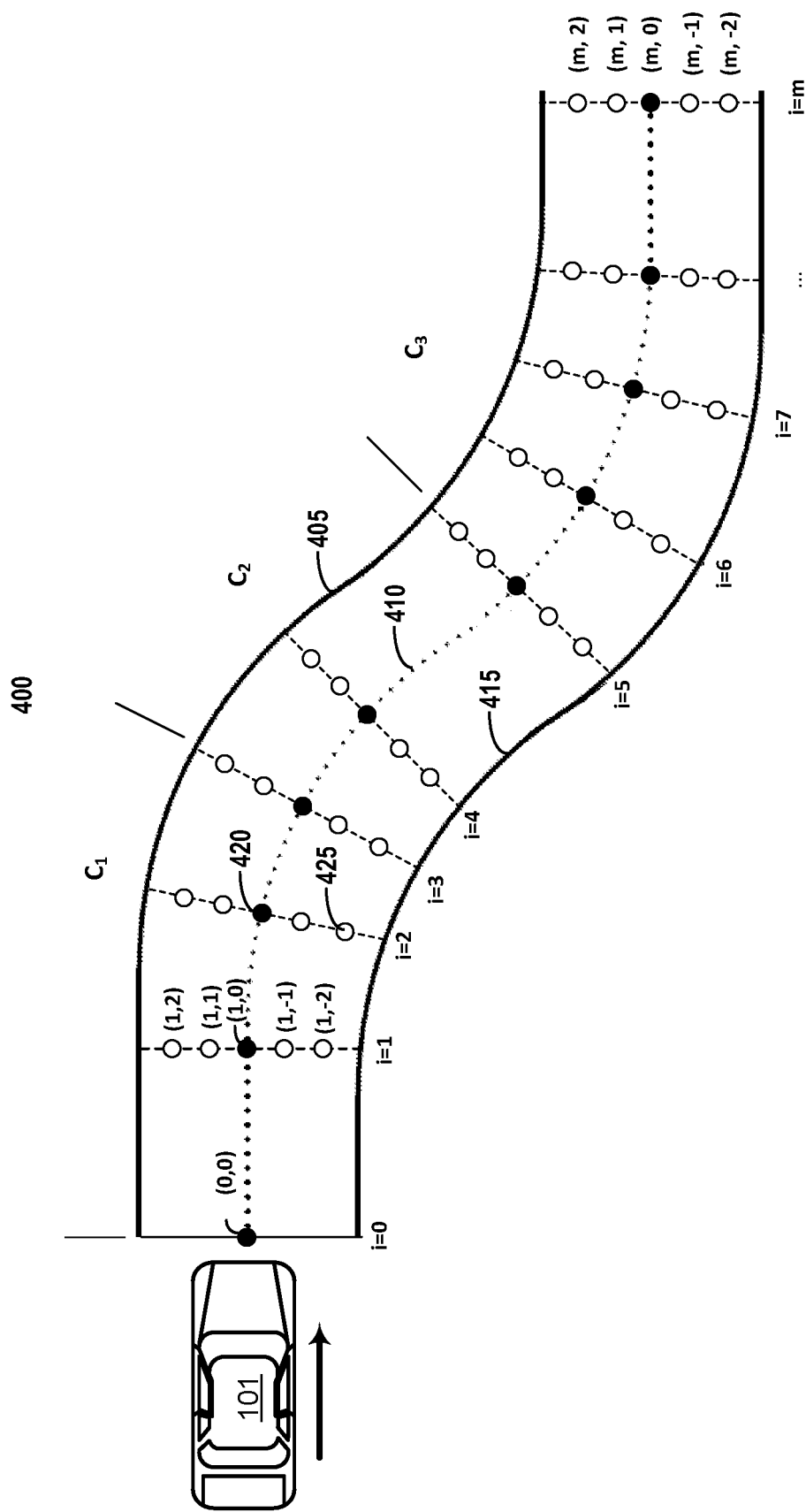
FIG. 4A illustrates a sample of center line points of a roadway for a two-step reference line smoothing method to mimic human driving behaviors for autonomous driving vehicles, according to some embodiments.
Figure 4B:
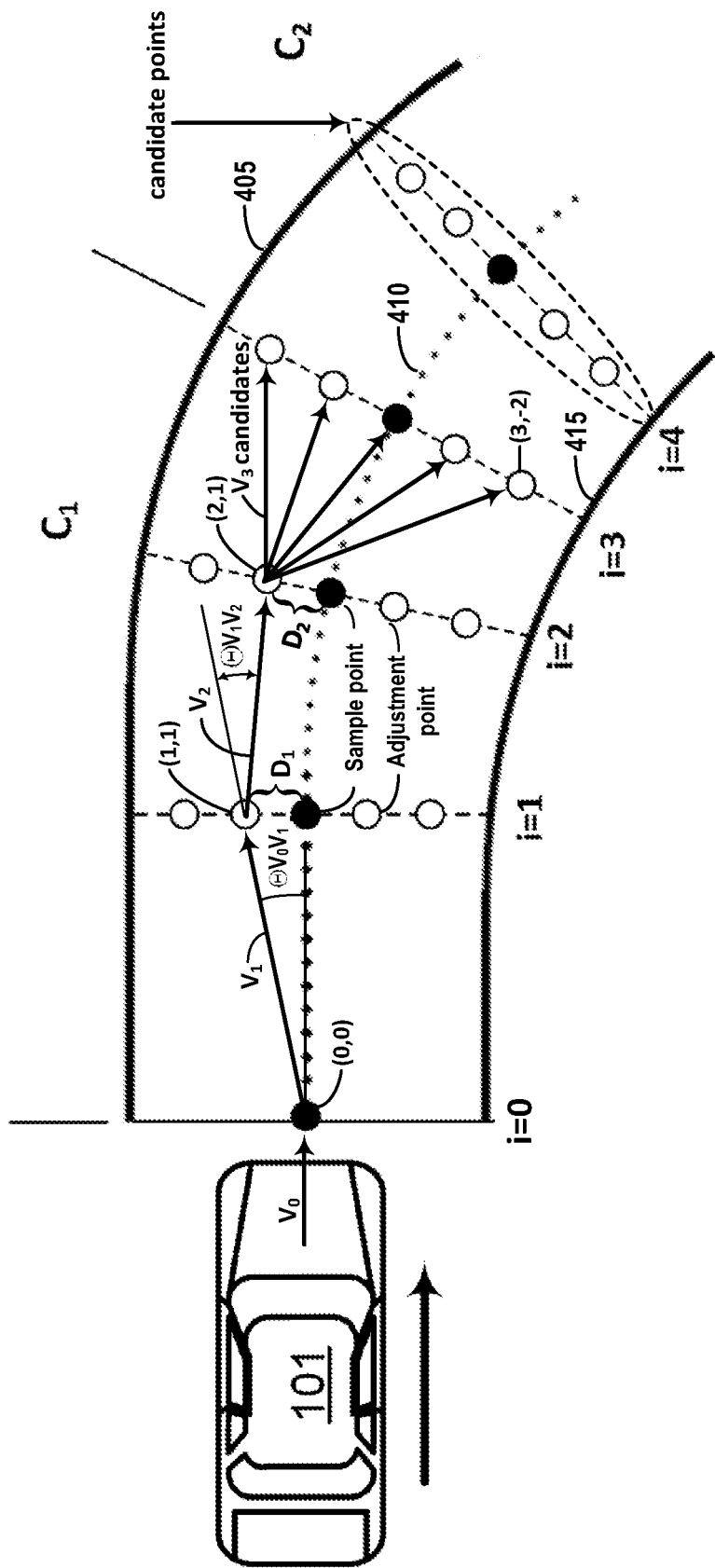
FIG. 4B illustrates candidate adjustment points to a sample of center line points of a roadway for a two-step reference line smoothing method to mimic human driving behaviors for autonomous driving vehicles, according to some embodiments.
Figure 4C:
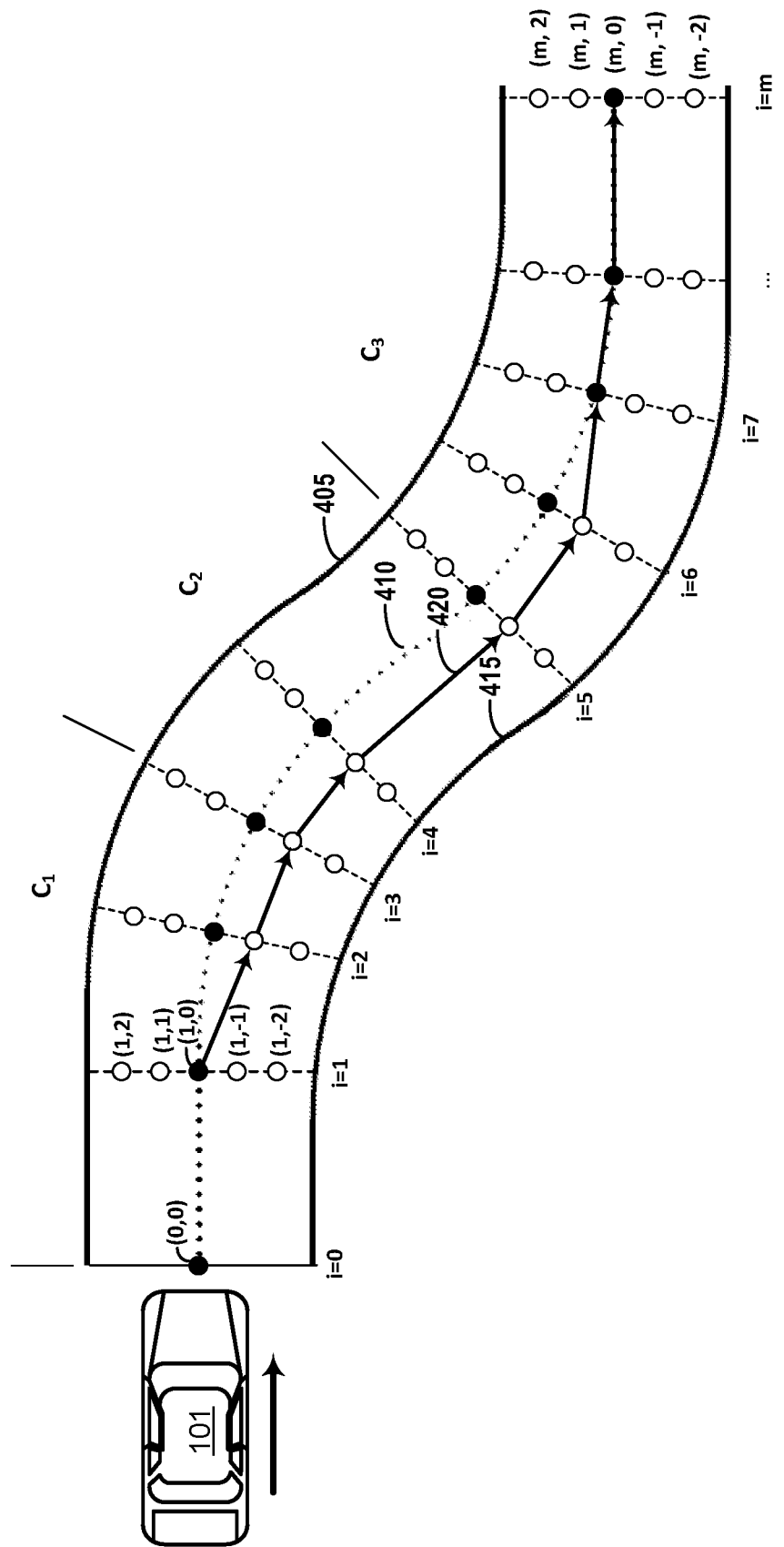
FIG. 4C illustrates sub-curves to be joined into a reference path of a two-step reference line smoothing method to mimic human driving behaviors for autonomous driving vehicles, according to some embodiments.

Least cost path module 308 is further described now with reference to FIGS. 4A through 4C. FIG. 4A illustrates a sample of center line points, and adjustment points at the sample points, of a roadway for a method of generating a smooth reference line to mimic human driving behaviors for autonomous driving vehicles, according to some embodiments. FIG. 4B illustrates candidate adjustment points to a sample of center line points with adjustment points (collectively candidate points of a sample point), and example possible paths through the candidate points, of a method of generating a smooth reference line to mimic human driving behaviors for autonomous driving vehicles, according to some embodiments. FIG. 4C illustrates sub-curves to be joined into a reference path of a method of generating a smooth reference line to mimic human driving behaviors for autonomous driving vehicles, according to some embodiments.

Referring now to FIG. 4A, in an embodiment, least cost path module 308 can first determine a centerline 410 of a lane of roadway, the lane having a left boundary 405 and a right boundary 415 with respect to a driving direction of the ADV 101. In a single lane roadway, the lane can be defined by a left and right physical roadway boundary, such as a curb, sidewalk, or painted lane stripe. In a multi-lane roadway, the physical lane boundary may similarly be determined by a paint stripe, curb, sidewalk, or a combination of these. In an embodiment, a lane width can be determined by sensor system 115 and a centerline can be determined by one physical boundary (left or right) and a lane width determined by the sensor system 115. Least cost path module 308 can take into account whether a multi-lane roadway consists of multiple lanes carrying traffic that is going a same direction, or multiple lanes carrying traffic in opposing direction. Least cost path module 308 can take the direction of traffic, and speed of the ADV 101, into account and may leave more, or less, buffer space between the ADV 101 and other cars or obstacles near the ADV 101, accordingly, when determining a centerline.

After determining a centerline of the lane of the roadway, least cost path module 308 can generate a plurality, i, of sample points 420, i=0 . . . m, along the centerline to represent the centerline. In an embodiment, least cost path module 308 can generate fewer sample points 420 of the centerline where the centerline is straighter, and increase the number of sample points 420 of the centerline as the curvature of the centerline increases. After generating the sample points 420, least cost path module 308 can further generate adjustment points 425 in an area surrounding each sample point 420. In an embodiment, least cost path module 308 may generate two or three adjustment points 425 on each side of the centerline near the sample point 420. For purposes of calculating the least cost path associated with the sample points 420, each sample point 420, and its associated adjustment points, are termed candidate points of the sample point 420. In an embodiment, candidate points of a sample point 420 are generated on a line substantially perpendicular to the centerline, at the sample point 420.

Referring now to FIG. 4B, least cost path module 308 can then select a subset of the sample points 420 associated with a path, comprising a portion of a route, along the centerline 410. For each triad of sample points i−1, i, i+1, a cost of each candidate path is determined from each candidate point at sample point i−1, through each candidate point at sample point i, to each candidate point at sample point i+1. Each candidate path includes a vector $V_1$ from a candidate point at sample point i−1 to a candidate point at sample point i, and a vector $V_2$ from the candidate point at sample point i to a candidate point at sample point i+1. In an embodiment, at each sample point i, candidate points may be indexed as, e.g., −2, −1, 0, 1, and 2, where sample point is the candidate point having index 0. Note that at sample point i=0, the only candidate point is the sample point at i=0 because i=0 represents a present location of the ADV.

Continuing with the example shown in FIG. 4B, when i=1, sample point i−1 is i=0 and sample point i+1 is i=2. A candidate path is shown through candidate points (0,0), (1,1), and (2,1). Vector $V_0$ represents a current velocity and direction of the ADV 101 at candidate point (0,0). Vector $V_1$ represents speed and direction of the ADV 101 from candidate point (0,0) to candidate point (1,1). Vector $V_2$ represents speed and direction from candidate point (1,1) to candidate point (2,1). From candidate point (0,0) to candidate point (1,1), ADV 101 makes a steering input, left, at angle $\Theta V_0 V_1$. Point (1,1) is a distance $D_1$ from sample point i=1, which is located at the centerline of the lane of roadway. A cost of traversing $V_1$ from candidate point (0,0) to candidate point (1,1) includes at least two components, $cost_1$ and $cost_2$, wherein $$cost_1 = f_1(\cos(\pi - 2 * \Theta V_0 V_1)) \text{ and} \quad (1)$$

$$cost_2 = f_2 |D_1|^2 \quad (2)$$

wherein $f_1$ and $f_2$ can be any monotonically increasing functions. In an embodiment, $f_1$ and $f_2$ can be different monotonically increasing functions. Similarly, from candidate point (1,1) to candidate point (2,1), ADV 101 makes a steering input, right, at angle $\Theta V_1 V_2$ Point (2,1) is a distance $D_2$ from sample point i=i+1, which is located at the centerline of the lane of roadway. A cost of traversing $V_2$ from candidate (1,1) to candidate point (2,1) includes at least two components $cost_1$ and $cost_2$, wherein $$cost_1 = f_1(\cos(\pi - 2 * \Theta V_1 V_2)) \text{ and} \quad (2)$$

$$cost_2 = f_2|D_2|^2 \quad (2)$$

For each permutation of candidate points at sample points i−1, i, and i+1, a cost is determined using the above cost functions. The cost computation can be extended to more than a triad of sample points, such as from i=1 to m, or any subset thereof. For example, as shown in FIGS. 4A through 4C, a route may be broken into to portions of the route, termed curves, C, e.g. curves $C_1$, $C_2$, and $C_3$. A curve is broadly construed in the mathematical meaning as a portion of a lane of roadway represented by a subset of sample points i=0 . . . m. A curve may contain portions of a lane that are straight, curved, or both. For each curve, C, a least cost path is determined. The least cost paths for each curve can then be splined together using a splining algorithm to generate a least cost path through the candidate points that represent the least cost path, as shown in FIG. 4C. Using the candidate points of the least cost curve, C, for a portion of the roadway, each curve, C, can be expressed as function, such as a two-dimensional (2D) polynomial function, of variables x and y:

$$C = f(g_1(x), g_2(y))$$

For each permutation of candidate points at sample points i−1, i, and i+1, a cost is determined using the above cost functions. The cost computation can be extended to more than a triad of sample points, such as from i=1 to m, or any subset thereof. For example, as shown in FIGS. 4A through 4C, a route may be broken into to portions of the route, termed curves, C, e.g. curves $C_1$, $C_2$, and $C_3$. A curve is broadly construed in the mathematical meaning as a portion of a lane of roadway represented by a subset of sample points i=0 .. m. A curve may contain portions of a lane that are straight, curved, or both. For each curve, C, a least cost path is determined. The least cost paths for each curve can then be splined together using a splining algorithm to generate a least cost path through the candidate points that represent the least cost path, as shown in FIG. 4C. Using the candidate points of the least cost curve, C, for a portion of the roadway, each curve, C, can be expressed as function, such as a two-dimensional (2D) polynomial function, of variables x and y:

$$C = f(g_1(x), g_2(y))$$

By converting the functions $g_1$ and $g_2$ to functions of a location at time, t, curve C can be expressed as:

$$C = f(g'_1(t), g'_2(t)) \quad (4)$$

A general function for a least cost path through an arbitrary number of sample points can be represented as:

$$\min \sum_{i=0}^{m} [f_1(\cos(\pi - 2\Theta_i)) + f_2(|D_i|^2)] \quad (5)$$

In an embodiment, least cost path module 308 can pre-parse the sample points before performing the least cost path curve analysis, to determine, e.g. a maximum steering angle, $\Theta_{MAX}$, for traversing the sample points, and a baseline cost of traversing the sample points. In an embodiment, least cost path module 308 may discard candidate points at sample points having a $\Theta V_{i-1} V_i$ or $\Theta V_i V_{i+1}$ that require steering inputs that are greater than $\Theta_{MAX}$ or greater than the maximum steering input angle possible for the ADV 101. Such pre-processing can reduce the computational complexity of determining the least cost path for a set of sample points and associated candidate points. For example, in FIG. 4B, it can be seen that the candidate $V_3$ through candidate points (2,1) and (3,−2) would require a very sharp steering input with respect to $V_2$, such that $\eta V_2 V_3$ may exceed $\eta_{MAX}$ or the maximum permissible steering input for the ADV 101. Thus, a cost for traversing this candidate $V_3$ from $V_2$ may be discarded without computing the cost of traversing $V_2$ and this $V_3$.

After computing a least cost path for curves, C, e.g., $C_1$, $C_2$, and $C_3$, the curves may be combined using a splining algorithm, as shown in FIG. 4C.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
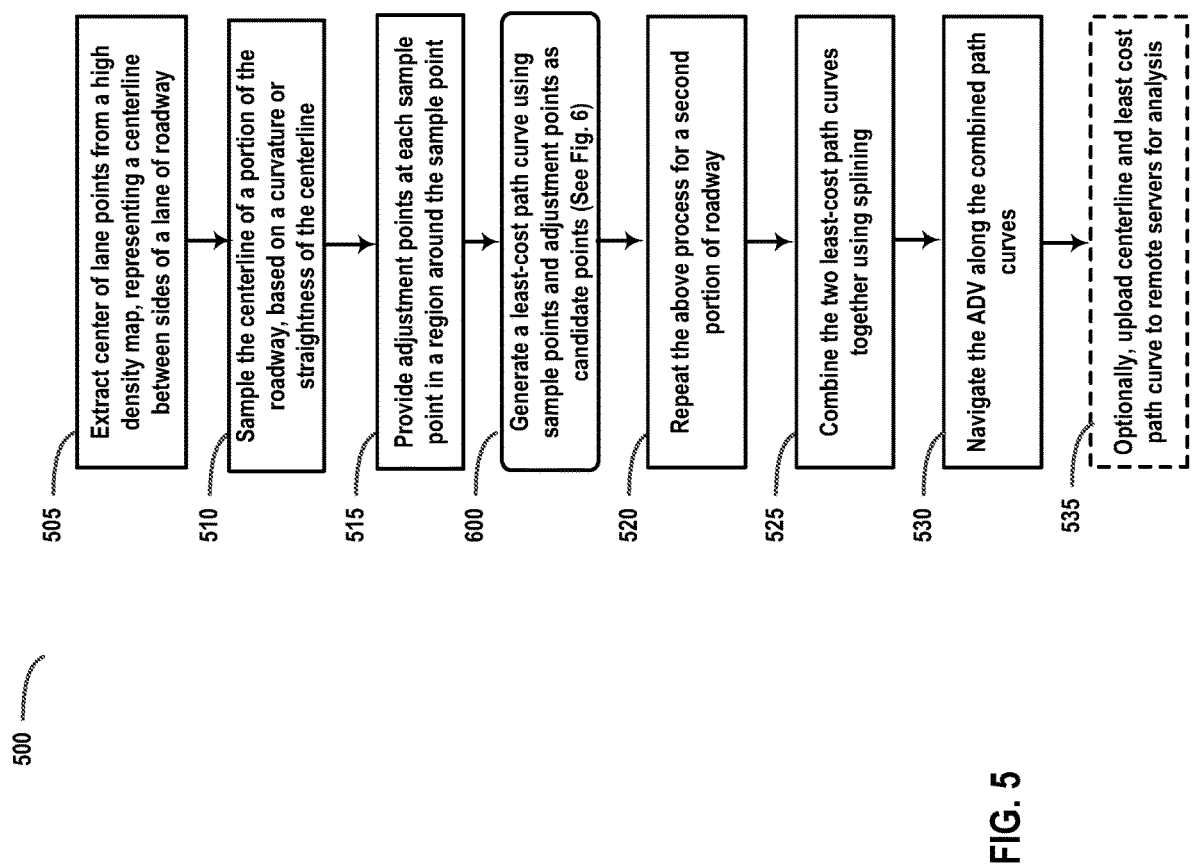
FIG. 5 illustrates, in block diagram form, an overview of a reference line smoothing method to mimic human driving behaviors for autonomous driving vehicles, according to some embodiments

FIG. 5 illustrates, in block diagram form, an overview of a method 500 of determining a least cost, smooth reference line to mimic human driving behaviors for autonomous driving vehicles, according to some embodiments.

In operation 505, points representing a centerline of a lane of a portion of a roadway are extracted from a high-definition (HD) map. The HD map can be an HD map stored in ADV 101 memory, or downloaded from an HD map service via a communication system of the ADV 101. The HD map data of the roadway may be supplemented by sensor data of on-board sensor system 115 to determine right and left boundaries of the lane of roadway. Boundaries may be physical boundaries, such as a curb, a sidewalk, or a paint stripe or reflector. Right and left can be with respect to a driving direction of the ADV 101. In an embodiment, a lane can be determined using either a right or left physical boundary, combined with an estimated lane width taking into account a width of the ADV and distance to obstacles surrounding the ADV 101, detected by the ADV perception module. A centerline of the lane can be determined as a being equidistant from the right and left boundaries of the lane. In an embodiment, ADV sensor data may determine that there are numerous pedestrians or other obstacles and, e.g., the right side of the ADV, and the centerline may be slightly biased away from the obstacles to increase safety.

In operation 510, least cost path module 308 can sample the points of the centerline extracted from the HD map. A sampling of centerline points can be more sparse for straighter portions of the lane of roadway and denser in relation to increased curvature of the lane of roadway.

In operation 515, least cost path module 308 can determine adjustment points for each sample point, in a region surrounding the sample point. In an embodiment, the adjustment points can be on a line perpendicular to the centerline of the lane at the sample point. A number of adjustment points can be, e.g. 2 or 3 adjustment points on each side of the centerline of the lane of roadway at the sample point. In an embodiment there can be 5 to 7 adjustment points. In an embodiment, adjustment points can separated by 0.2 to 0.5 meters. In an embodiment, the number of adjustment points on each side of the centerline can differ. In an embodiment, the number of adjustment points generated can be increased in relation to an increase in computing power of a processor that performs the least cost path computation. At each sample point, a set of candidate points for least cost path analysis includes the sample point and the adjustment points.

In operation 600, a least cost path curve can be generated using the sample candidate points (sample points plus adjustment points at each sample point). Operation 600 is described in detail, below, with reference to FIG. 6.

In operation 520, the preceding operations 505 through 600 can be repeated for a second portion of a lane of roadway. One skilled in the art understands that some operations of 505 through 515 may be performed for both a first portion and second portion of roadway at once, and the least cost determination for the first portion or second portion of roadway may be performed separately. For example, a centerline of a lane of roadway may be determined for both the first portion of the roadway and a second portion of the roadway along a route. In an embodiment, the centerline of the lane of roadway can be determined for an entire route prior to beginning navigation of the route, from starting to ending of the route. Sampling of the centerline of the lane of roadway, and/or providing adjustment points at each sample point, may also be done at a single time for more than one portion of the lane of roadway.

In operation 525, the least cost path for each of the first portion and second portion of the lane of roadway can be combined to generate a single least cost path for both portions of the lane of roadway. In an embodiment, the least cost paths for the two portions of roadway can be combined using a splining algorithm.

In operation 530, the ADV 101 can be navigated along the least cost path of the combined least cost paths through the two portions of the roadway, as shown in FIG. 4C.

In operation 535, least cost path module 308 can upload the centerline data and combined least cost path for the combined portions of roadway to a remote server for analysis. In an embodiment, ADV logic can also upload control data and sensor data measured while the ADV traversed the least cost path for the combined portions of roadway. Control data can include steering input, throttle input, braking input and speed data. Sensor data may include inertial measurement data. In an embodiment, uploaded control and sensor data can be correlated with the sample points and/or candidate point at each sample point along the least cost path.

Figure 6:
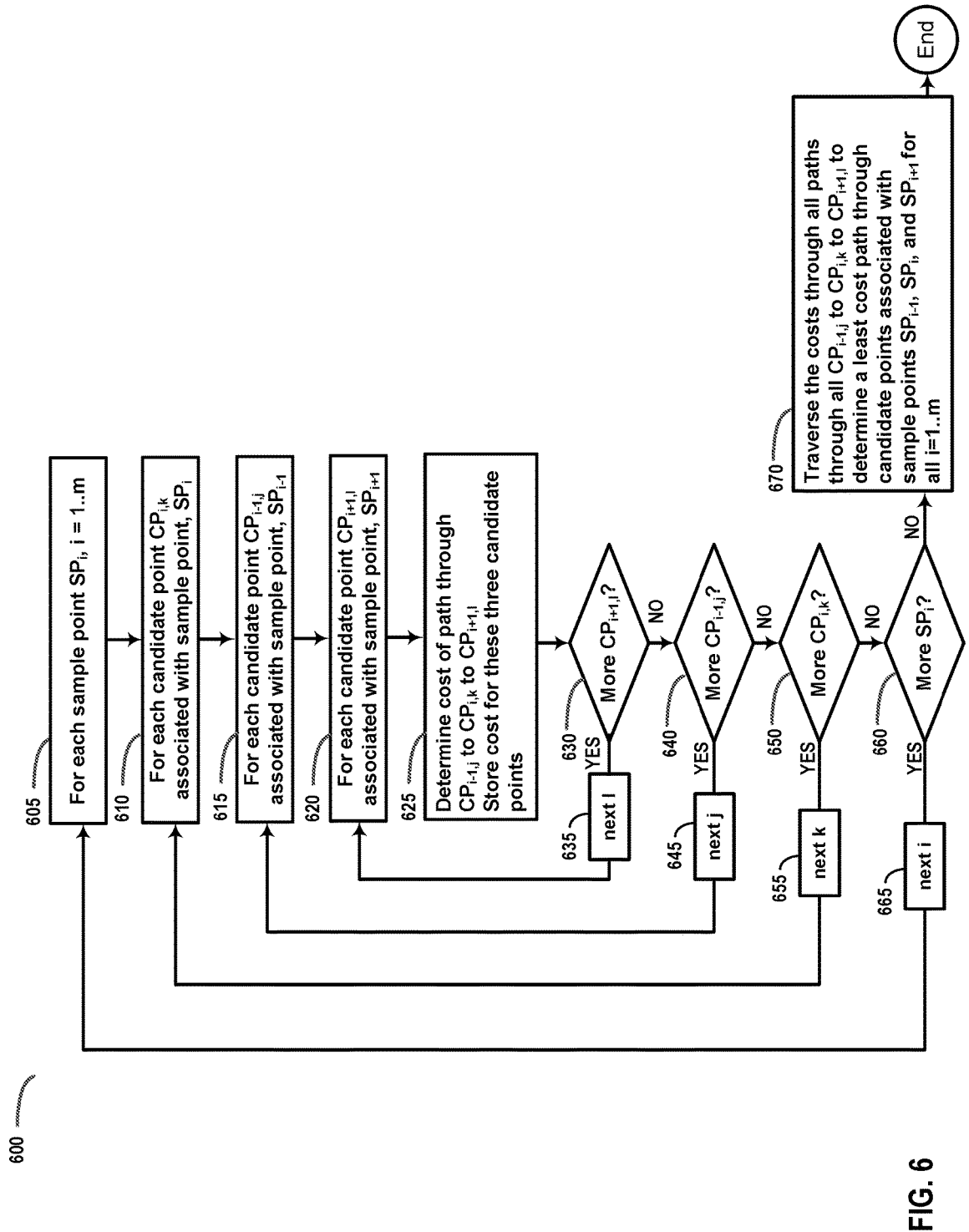
FIG. 6 illustrates, in block diagram form, a detailed view of a reference line smoothing method to mimic human driving behaviors for autonomous driving vehicles, according to some embodiments

FIG. 6 illustrates, in block diagram form, a detailed view of a method 600 of generating a least cost path through a portion of a lane of roadway to mimic human driving behaviors for autonomous driving vehicles, according to some embodiments. The least cost path determination is an iterative process that computes a cost of traversing all permutations of candidate points at each sample point in a portion of a lane of a roadway. As described above, some candidate point traversals may be excluded from the list of permutations based upon traversal of the candidate point requiring a steering input angle that is greater than the ADV maximum possible steering input. A candidate point traversal may also be excluded based upon an estimated inertial value e.g. a lateral force, to traverse the candidate point to next candidate point, being greater than a threshold amount which would cause discomfort to passengers of the ADV 101. As shown above, with reference to FIG. 4B, there may be, e.g., 2 or 3 adjustment points on each side of a centerline surrounding each sample point and candidate points include the sample point and adjustment points. In an embodiment there can be 5 to 7 adjustment points. In an embodiment, adjustment points can separated by 0.2 to 0.5 meters. In FIG. 6, an example of 2 adjustment points on each side of the centerline at each sample point is used. Thus candidate points may be indexed as −2, −1, 0, 1, and 2, wherein, for any particular sample point, a candidate point index of 0 represents the sample point, and the remaining candidate points are indexed away from the sample point, which is at the centerline of the lane of the roadway. One of skill in the art understands that there may be more, or fewer, adjustment points than 2 on each side of the centerline. And, as described above, the number of adjustment points on either side of the centerline, at the sample point, can differ.

In operation 605, sample points, $SP_i$, can be indexed by a loop variable, i=1 . . . m.

In operation 610, for each sample point $SP_i$, candidate points of sample point $SP_i$ may be indexed by a loop variable k: candidate point $CP_{(i,k)}$. As described above, k can be indexed with values, e.g. −2, −1, 0, 1, and 2, wherein index k=0 represents the sample point $SP_i$.

In operation 615, candidate points of sample point $SP_{i-1}$ may be indexed by a loop variable j: $CP_{(i-1,k)}$. As described above, j can be indexed with values, e.g. −2, −1, 0, 1, and 2, wherein index j=0 represents the sample point $SP_{i-1}$.

In operation 620, for each sample point $SP_{i+1}$, candidate points of sample point $SP_{i+1}$ may be indexed by a variable l (lower case L): $CP_{(i+l,l)}$. As described above, loop variable, l, can be indexed with values, e.g. −2, −1, 0, 1, and 2, wherein index l=0 represents the sample point $SP_{i+1}$.

In operation 625, a cost of traversing the path from candidate point $CP_{(i-1,j)}$ of sample point $SP_{i-1}$ to candidate point $CP_{(i,k)}$ of sample point $SP_i$ to candidate point $CP_{(i+1,l)}$ of sample point $SP_{i+1}$, can be determined. The specifics of the computation are described above with reference to FIG. 4B. The cost associated with traversing candidates $C_{(i-1,j)}$, $C_{(i,k)}$, and $C_{(i+1,l)}$ can be stored with reference to sample point $SP_i$. In an embodiment, a steering input angle required to traverse the candidates $C_{(i-1,j)}$, $C_{(i,k)}$, and $C_{(i+1,l)}$ can also be stored. In addition, in an embodiment, an estimated inertial measurement can be stored with the least cost of traversing the candidate points $C_{(i-1,j)}$, $C_{(i,k)}$, and $C_{(i+1,l)}$ and the steering angle data associated with traversing the candidate points $C_{(i-1,j)}$, $C_{(i,k)}$, and $C_{(i+1,l)}$. Least cost path module 308 can utilize the steering angle and estimated inertial measurement to determine whether this candidate path should be discarded from consideration in the least cost path determination of operation 670, either because the required steering angle cannot be met by the ADV or the estimated inertial measurement may be uncomfortable for the ADV passengers.

In operation 630, it can be determined whether there are more candidate points $CP_{(i+1,l)}$ to traverse. If so, then l (lower case L) is set to a next index value in operation 635 and method 600 continues at operation 620. Otherwise, method 600 continues at operation 640.

In operation 640, it can be determined whether there are more candidate points $CP_{(i-1,j)}$ to traverse. If so, then j is set to a next index value in operation 645 and method 600 continues at operation 615. Otherwise method 600 continues at operation 650.

In operation 650, it can be determined whether there are more candidate points $CP_{(i,k)}$ to traverse. If so, then k is set to a next index value in operation 655 and method 600 continues at operation 610. Otherwise method 600 continues at operation 660.

In operation 660, it can be determined whether there are more sample points $SP_i$ to traverse. If so, then i is set to a next index value in operation 665 and method 600 continues at operation 605. Otherwise, method 600 continues at operation 670.

In operation 670, all paths $CP_{(i-1,j)}$ to $CP_{(i,k)}$ to $CP_{(i+i,l)}$ for all i=1 . . . m can be traversed to determine a least cost path through the candidate points for the portion of a lane of roadway on a route of the ADV. The determined least cost path can be stored in association with the portion of the lane of the roadway for which the analysis was performed.

Figure 7:
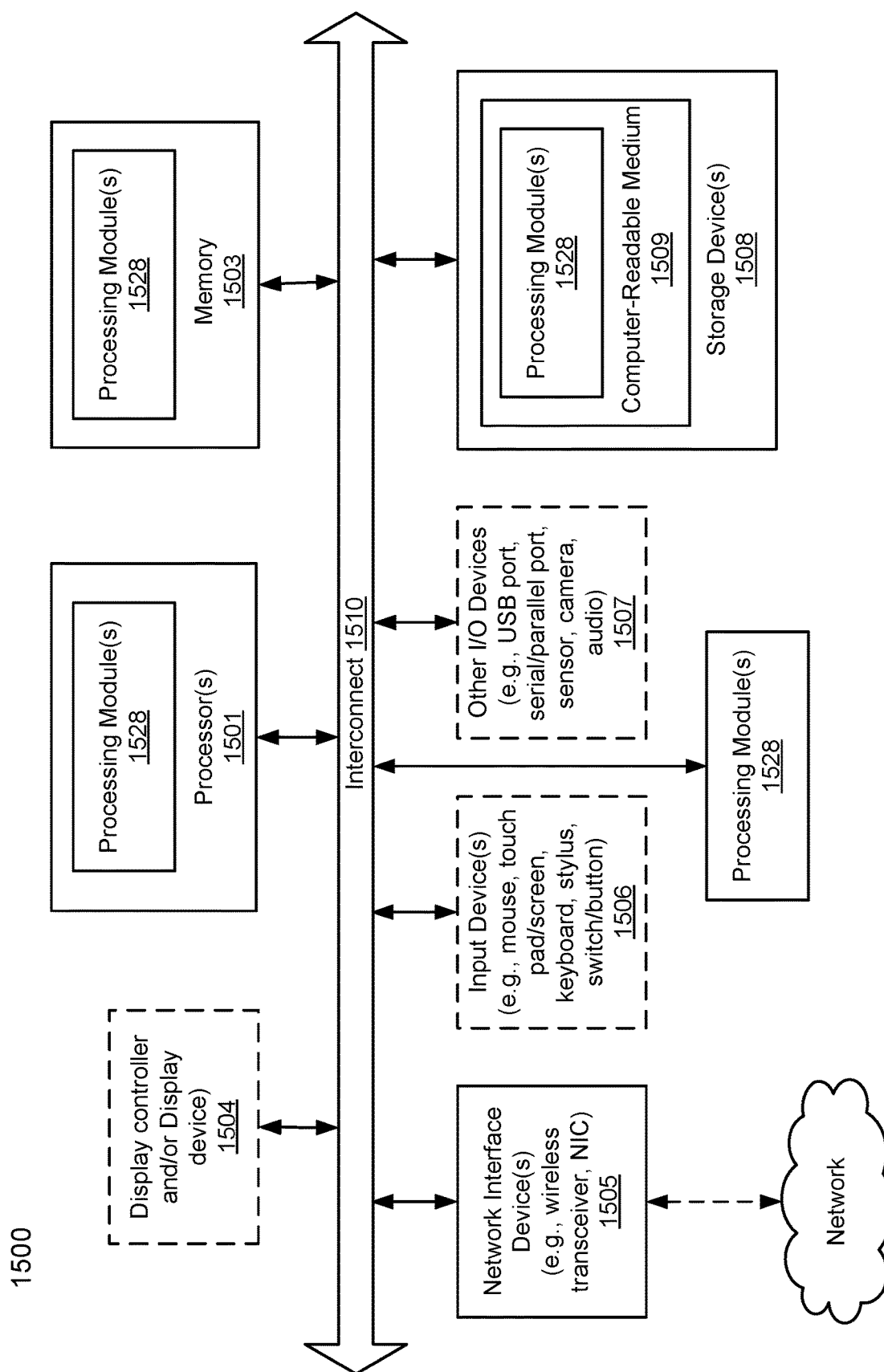
FIG. 7 is a block diagram illustrating a data processing system according to one embodiment.

FIG. 7 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a high frequency (e.g. 2.4 GHz to 2.48 GHz) short range wireless transceiver such as a BLUETOOTH® transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, routing module 307, and least cost path module 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of navigating an autonomous driving vehicle (ADV), the method comprising:
    extracting point data representing a centerline of a lane from a high definition map;
    sampling the point data to obtain a plurality of points from the centerline of the lane of a first portion of a roadway to generate a plurality of sample points;
    for each sample point $SP_i$ in the plurality of sample points $SP_{i=1\ldots m}$ of the first portion of the roadway, generating a plurality of adjustment points associated with the sample point, the adjustment points in a region surrounding the sample point $SP_i$, wherein the sample point and the plurality of adjustment points comprise candidate points $CP_{i,j=1\ldots n}$ for the sample point;
    for each sample point $SP_{i=1\ldots m}$ in the first portion of the roadway:
        determining a path from each candidate point $CP_{i-1,k=1\ldots n}$ of a preceding sample point $SP_{i-1}$, through candidate point $CP_{i,j}$, to each candidate point $CP_{i+1,l=1\ldots n}$, of a subsequent sample point$_{SP1+1}$ and determining a required steering angle $\Theta$ to navigate the path through candidate point $CP_{i,j}$;
        discarding any path through candidate point $CP_{i,j}$ that requires a steering angle $\Theta$ greater than a maximum value; and
        determining a least cost path through candidate point $CP_{i,j}$ and storing the path and the least path cost in association with candidate point $CP_{i,j}$;
    generating a first lowest cost path for the first portion of the roadway, wherein the first lowest cost path passes through one candidate point of each sample point of the plurality of sample points;
    navigating the ADV along the first lowest cost path for the first portion of the roadway.

2. The method of claim 1, further comprising:
    generating a second lowest cost path for a second portion of the roadway;
    combining, using a splining algorithm, the first lowest cost path of the first portion of roadway with the second lowest cost path for the second portion of roadway to generate a combined path; and
    navigating the ADV along the combined path.

3. The method of claim 1, wherein:
    determining the path from each candidate point $CP_{i-1,k=1\ldots n}$ of the preceding sample point $SP_{i-1}$ to the candidate point $CP_{i,j}$ of sample point $SP_i$ includes determining a speed and direction vector $V_1$, and for each path from the candidate point $CP_{i,j}$ to each candidate point $CP_{i-1,k=1\ldots n}$ of the subsequent sample point $SP_{i+1}$ includes determining a speed and direction vector $V_2$, and includes determining an inertia value to traverse a path formed by $V_1$ and $V_2$, through candidate point $CP_{i,j}$ and discarding the path formed by $V_1$ and $V_2$ if the inertia value exceeds a threshold value.

4. The method of claim 1, wherein the plurality of adjustment points for each sample point are generated on a line substantially perpendicular to the centerline of the roadway at the sample point, and candidate points are generated on each side of the centerline of the lane, and one of the candidate points is the same as the sample point $SP_i$.

5. The method of claim 1, wherein a density of the sampling of points in the plurality of sample points is higher in a portion of the roadway containing a curve than in a portion of the roadway that is substantially straight.

6. The method of claim 1, wherein the first lowest cost path is determined by determining a sum of the cost of navigating from each candidate point at the preceding sample point, through each candidate point at the sample point, to each candidate point at the subsequent sample point.

7. The method of claim 1, wherein the plurality of sample points are pre-parsed to determine whether any sequence of candidate points requires the steering angle $\Theta$ greater than the maximum value, and if so, then one or more candidate points are discarded prior to determining the cost of any path through candidate points.

8. The method of claim 7, wherein the cost through each candidate point at the sample point is determined further based on a distance between the candidate point and the center line, and wherein a total cost of a path candidate is determined based on a sum of the cost of each candidate point forming the candidate path.

9. A non-transitory machine-readable medium having instructions stored therein, which when executed by a processor, cause the processor to perform operations, the operations comprising:
    extracting point data representing a centerline of a lane from a high definition map;
    sampling the point data to obtain a plurality of points from a centerline of the centerline of the lane of a first portion of a roadway to generate a plurality of sample points;
    for each sample point $SP_i$ in the plurality of sample points $SP_{i=1\ldots m}$ of the first portion of the roadway, generating a plurality of adjustment points associated with the sample point, the adjustment points in a region surrounding the $SP_i$ sample point, wherein the sample point and the plurality of adjustment points comprise plurality of candidate points $CP_{i,j=1\ldots n}$ for the sample point;
    for each sample point $SP_{i=1\ldots m}$ in the first portion of the roadway:
        determining a path from each candidate point $CP_{i-1,k=1\ldots n}$ of a preceding sample point $SP_{i-1}$, through candidate point $CP_{i,j}$, to each candidate point $CP_{i+1,l=1\ldots n}$, of a subsequent sample point $SP_{i+1}$, and determining a required steering angle $\Theta$ to navigate the path through candidate point $CP_{i,j}$;
        discarding any path through candidate point $CP_{i,j}$ that requires a steering angle $\Theta$ greater than a maximum value; and
        determining a least cost path through candidate point $CP_{i,j}$ and storing the path and the least path cost in association with candidate point $CP_{i,j}$;
    generating a first lowest cost path for the first portion of the roadway, wherein the lowest cost path passes through one candidate point of each sample point of the plurality of sample points;

navigating the ADV along the first lowest cost path for the first portion of the roadway.

10. The medium of claim 9, further comprising:
generating a second lowest cost path for a second portion of the roadway;
combining, using a splining algorithm, the first lowest cost path of the first portion of roadway with the second lowest cost path for the second portion of roadway to generate a combined path; and
navigating the ADV along the combined path.

11. The medium of claim 9, wherein:
determining the path from each candidate point $CP_{i-1,k=1\ldots n}$ of the preceding sample point $SP_{i-1}$ to the candidate point $CP_{i,j}$ of sample point $SP_i$ includes determining a speed and direction vector $V_1$, and for each path from the candidate point $CP_{i,j}$ to each candidate point $CP_{i-1,k=1\ldots n}$ of the subsequent sample point $SP_{i-1}$ includes determining a speed and direction vector $V_2$, and includes determining an inertia value to traverse a path formed by $V_1$ and $V_2$ and through candidate point $CP_{i,j}$, and discarding the path formed by $V_1$ and $V_2$ if the inertia value exceeds a threshold value.

12. The medium of claim 11, wherein the plurality of sample points are pre-parsed to determine whether any sequence of candidate points requires the steering angle $\Theta$ greater than the maximum value, and if so, then one or more candidate points are discarded prior to determining the cost of any path through candidate points.

13. The medium of claim 12, wherein the cost through each candidate point at the sample point is determined further based on a distance between the candidate point and the center line, and wherein a total cost of a path candidate is determined based on a sum of the cost of each candidate point forming the candidate path.

14. The medium of claim 9, wherein the plurality of adjustment points for each sample point are generated on a line substantially perpendicular to the centerline of the roadway at the sample point and candidate points are generated on each side of the centerline of the lane, and one of the candidate points is the same as the sample point $SP_i$.

15. The medium of claim 9, wherein a density of the sampling of points in the plurality of sample points is higher in a portion of the roadway containing a curve than in a portion of the roadway that is substantially straight.

16. The medium of claim 9, wherein the first lowest cost path is determined by determining a sum of the cost of navigating from each candidate point at the preceding sample point, through each candidate point at the sample point, to each candidate point at the subsequent sample point.

17. A data processing system, comprising:
a processor; and
a memory coupled to the processor to store instructions, which when executed by the processor, cause the processor to perform operations, the operations including
extracting point data representing a centerline of a lane from a high definition map;
sampling the point data to obtain a plurality of points from the centerline of the lane of a first portion of a roadway to generate a plurality of sample points;
for each sample point $SP_i$ in the plurality of sample points $SP_{i=1\ldots m}$ of the first portion of the roadway, generating a plurality of adjustment points associated with the sample point, the adjustment points in a region surrounding the sample point $SP_i$, wherein the sample point and the plurality of adjustment points comprise candidate points $CP_{i,j=1\ldots n}$ for the sample point;
for each sample point $SP_{i=1\ldots m}$ in the first portion of the roadway:
determining a path from each candidate point $CP_{i-1,k=1\ldots n}$ of a preceding sample point $SP_{i-1}$, through candidate point $CP_{i,j}$, to each candidate point $CP_{i+1,l=1\ldots n}$ of a subsequent sample point $SP_{i+1}$ and determining a required steering angle $\Theta$ to navigate the path through candidate point $CP_{i,j}$;
discarding any path through candidate point $CP_{i,j}$ that requires a steering angle $\Theta$ greater than a threshold maximum value; and
determining a least cost path through candidate point $CP_{i,j}$ and storing the path and the least path cost in association with candidate point $CP_{i,j}$;
generating a first lowest cost path for the first portion of the roadway, wherein the lowest cost path passes through one candidate point of each sample point of the plurality of sample points;
navigating the ADV along the first lowest cost path for the first portion of the roadway.

18. The system of claim 17, further comprising:
generating a second lowest cost path for a second portion of the roadway;
combining, using a splining algorithm, the first lowest cost path of the first portion of roadway with the second lowest cost path for the second portion of roadway to generate a combined path; and
navigating the ADV along the combined path.

19. The system of claim 17, wherein:
determining the path from each candidate point $CP_{i-1,k=1\ldots n}$ of a preceding sample point $SP_{i-1}$ to the candidate point $CP_{i,j}$ of sample point $SP_i$ includes determining a speed and direction vector $V_1$, and for each path from the candidate point $CP_{i,j}$ to each candidate point $CP_{i-1,k=1\ldots n}$ of the subsequent sample point $SP_{i-1}$ includes determining a speed and direction vector $V_2$, and includes determining an inertia value to traverse a path formed by $V_1$ and $V_2$, through candidate point $CP_{i,j}$ and discarding the path formed by $V_1$ and $V_2$ if the inertia value exceeds a threshold value.

20. The system of claim 17, wherein the plurality of adjustment points for each sample point are generated on a line substantially perpendicular to the centerline of the roadway at the sample point, and candidate points are generated on each side of the centerline of the lane, and one of the candidate points is the same as the sample point $SP_i$.

21. The system of claim 17, wherein a density of the sampling of points in the plurality of sample points is higher in a portion of the roadway containing a curve than in a portion of the roadway that is substantially straight.

22. The system of claim 17, wherein the first lowest cost path is determined by determining a sum of the cost of navigating from each candidate point at the preceding sample point, through each candidate point at the sample point, to each candidate point at the subsequent sample point.

23. The system of claim 17, wherein the plurality of sample points are pre-parsed to determine whether any sequence of candidate points requires the steering angle $\Theta$ greater than the maximum value, and if so, then one or more candidate points are discarded prior to determining the cost of any path through candidate points.

24. The system of claim 23, wherein the cost through each candidate point at the sample point is determined further based on a distance between the candidate point and the center line, and wherein a total cost of a path candidate is determined based on a sum of the cost of each candidate point forming the candidate path.

* * * * *